United States Patent
Vargas-Cervantes et al.

(10) Patent No.: US 10,029,508 B2
(45) Date of Patent: Jul. 24, 2018

(54) METHOD FOR SHAPING SYNTHETIC PAPER, HOLDING STRIP FORMED BY SUCH A METHOD, AND SHEET HOLDING DEVICE

(76) Inventors: Jose Daniel Vargas-Cervantes, Guanajato (MX); Mabel Guadalupe Diaz-Lopez, Guanajato (MX); Eduardo Diaz-Lopez, Guanajato (MX)

(*) Notice: Subject to any disclaimer, the term of this patent is extended or adjusted under 35 U.S.C. 154(b) by 215 days.

(21) Appl. No.: 14/413,778

(22) PCT Filed: Jul. 10, 2012

(86) PCT No.: PCT/MX2012/000066
§ 371 (c)(1),
(2), (4) Date: Apr. 24, 2015

(87) PCT Pub. No.: WO2014/011022
PCT Pub. Date: Jan. 16, 2014

(65) Prior Publication Data
US 2015/0258842 A1    Sep. 17, 2015

(51) Int. Cl.
| | |
|---|---|
| B42F 13/06 | (2006.01) |
| B42F 13/40 | (2006.01) |
| G09F 1/10 | (2006.01) |
| G09F 1/06 | (2006.01) |
| B42D 5/04 | (2006.01) |
| B29C 51/26 | (2006.01) |
| B29C 51/42 | (2006.01) |
| B42B 5/08 | (2006.01) |
| B29C 51/00 | (2006.01) |
| B29K 105/00 | (2006.01) |

(Continued)

(52) U.S. Cl.
CPC .............. *B42F 13/06* (2013.01); *B29C 51/26* (2013.01); *B29C 51/42* (2013.01); *B42B 5/08* (2013.01); *B42D 5/041* (2013.01); *B42D 5/043* (2013.01); *B42F 13/40* (2013.01); *G09F 1/06* (2013.01); *G09F 1/10* (2013.01); *B29C 51/00* (2013.01); *B29C 51/14* (2013.01); *B29C 51/422* (2013.01); *B29C 51/428* (2013.01); *B29C 2793/0009* (2013.01); *B29C 2793/0081* (2013.01); *B29C 2795/002* (2013.01); *B29K 2105/0097* (2013.01); *B29L 2031/7282* (2013.01); *Y10T 24/207* (2015.01)

(58) Field of Classification Search
CPC ..... A47B 23/042; A47B 23/043; A47B 23/06; A47B 2023/047; B42D 5/041
See application file for complete search history.

(56) References Cited

U.S. PATENT DOCUMENTS

| 550,382 A | * | 11/1895 | Stuart et al. | A47B 23/042 248/451 |
|---|---|---|---|---|
| 2,252,571 A | * | 8/1941 | Milton | A47G 1/141 248/459 |

(Continued)

*Primary Examiner* — Robert Sandy
*Assistant Examiner* — Rowland Do
(74) *Attorney, Agent, or Firm* — Hoglund & Pamias, PSC; Roberto J. Rios

(57) ABSTRACT

A method for thermoforming synthetic paper is provided, more concretely for thermoforming holding strips of synthetic paper, the strips being used to produce sheet-holding devices of a specific configuration. The devices can be used in the assembly of sheet holders such as calendars, white sheet dispensers or information cards.

6 Claims, 6 Drawing Sheets

(51) Int. Cl.
*B29L 31/00* (2006.01)
*B29C 51/14* (2006.01)

(56) References Cited

U.S. PATENT DOCUMENTS

| | | | | |
|---|---|---|---|---|
| 2,380,780 | A * | 7/1945 | Novak | B42F 13/402 281/33 |
| 2,726,835 | A * | 12/1955 | Hummel | A47F 5/112 211/73 |
| 3,410,516 | A * | 11/1968 | Criswell | A47B 23/04 248/459 |
| 4,105,182 | A * | 8/1978 | Jacobson | A47B 23/044 211/42 |
| 4,157,152 | A * | 6/1979 | Blastic | A63B 57/00 224/247 |
| 4,709,895 | A * | 12/1987 | Mardak | A47B 23/044 248/459 |
| 4,867,594 | A * | 9/1989 | Poulouin | B42D 5/008 281/44 |
| 4,886,231 | A * | 12/1989 | Doerksen | A47B 23/043 248/205.2 |
| 5,251,935 | A * | 10/1993 | Bottiglieri | B42F 13/402 281/33 |
| 5,253,840 | A * | 10/1993 | Sheremetta | A47B 23/043 248/205.3 |
| 5,379,979 | A * | 1/1995 | Due | B42D 5/043 248/441.1 |
| 5,722,628 | A * | 3/1998 | Menaged | A47B 23/043 211/50 |
| 6,010,158 | A * | 1/2000 | Croteau | A47B 23/044 248/456 |
| 6,213,439 | B1 * | 4/2001 | Giulie | A47B 97/04 248/459 |
| 6,435,466 | B1 * | 8/2002 | Adams | A47B 23/044 248/455 |
| 2004/0238700 | A1 * | 12/2004 | Gallagher | A47B 23/042 248/152 |
| 2012/0047697 | A1 * | 3/2012 | Vargas Cervantes et al. | B42F 13/02 24/489 |

* cited by examiner

METHOD FOR SHAPING SYNTHETIC PAPER, HOLDING STRIP FORMED BY SUCH A METHOD, AND SHEET HOLDING DEVICE

BACKGROUND AND FIELD OF THE INVENTION

This present invention refers to a process to make a plastic material and more precisely to a process for thermally manufacturing synthetic paper, a fastening strip made with this material and this process, a fastening device that uses the manufactured strip and to products to fasten sheets, previously perforated, that use this fastening device.

Document WO2009/134764 of Medoff is presented, which refers to methods for producing cellulosic materials to be used to manufacture paper that include treating dry cellulosic or lingo cellulosic raw materials having a first average molecular weight with ionizing radiation and controlling such radiation. Even though it refers to a process for producing cellulosic material, it does not refer to a process to modify the shape of a sheet of synthetic paper.

Also presented is Mexican document MX2006JL00043, which refers to a thermal forming device to produce items from a pre-form of natural fibers combined with a thermoplastic which is characterized because it covers an innovative thermal system based on specially designed electric resistances that allow a more efficient use of the energy resources used in the process. The thermal system consists of electric resistances each one having the energy distributors placed in the compression sheets of the thermal forming device, rods that couple with the distributors and are inserted into the mold until reaching a depth close to the molding surface and connectors that establish electrical coupling among the distributors and its associated rods to deliver electric energy that turns into heat only to those areas in which heating is required for the thermo-forming process. None of the elements described here mentions or suggests that it is a process for thermo-forming synthetic paper, in sheets.

WO/2008/063619 of BURNS refers to structures of molded polymers including pipes, plates, cards, bottles, etc. that are formed with silicon-doped nanoparticles over, with or in the polymer matrix. This invention is not related with nanoparticles.

We respectfully submit that these are the documents known to the inventors and that they are related in some way to the field of synthetic paper molding by thermoforming.

According to the above mentioned, it is believed that there is no existing process for thermo-forming synthetic paper and that also resembles in anyway to what is described here.

Regarding the fastener device, the closest prior art is in document WO/2009/MX/00021, which is an application presented by the same applicant of this invention. In this PCT application, a device with a configuration similar to the here described device is disclosed; however, there are important differences that, contrary to what is expected, improve in an important way the functioning of the device. It should be noted that this document neither describe or mention a method or process for thermo-forming synthetic paper, nor devices or products made using the device mentioned in this document.

Documents U.S. Pat. No. 4,867,594, U.S. Pat. No. 4,157,152, GB191024895, U.S. Pat. No. 3,016,224, DE29807829 and U.S. Pat. No. 2,925,239, also Spaniard patent 2108573 are known in the prior art. None of these documents describe a device that holds sheets like the present device does. The devices shown are not used to manufacture elements like calendars, recipe books, sheet dispensers or information cards, catalogs, phone books, etc.

The device described in document WO/2009/MX/00021 has some inconveniences now overcome by the object of the present invention. One of those inconveniences is that during operation, sheets get stuck when they are lifted, causing arrangement problems of the sheets already seen or used and even damage to the sheets. Another inconvenience is that the placement of the device on its base prevented its application to other articles such as calendars, information cards dispensers or similar elements. A second base was needed so the tab in the device could be kept in place and to keep it in position since it has a much smaller moving space.

To prevent sheets from getting stuck, it was envisioned to increase the diameter of the curved part of the device. This increase in the diameter of the ring, curved part or fastening hook, which appears simple, was not simple to implement because the manufacturing process did not allow obtaining the ring with the desired characteristics as will be shown later and thus it was necessary to carryout important analyses in order to find other materials not having the problems described below. This search was unsuccessful and given this failure, it was searched and the manufacturing process of the fastener built based on synthetic paper could be modified, in order to obtain the desired properties.

The process had to be modified since the desired product had two inconveniences when formed by matching molding: a) a burr that decreased elasticity properties indispensable for the correct functioning of the device and b) its impossibility to be used in the manufacturing of a device with a larger diameter and smaller caliber. Therefore, a manufacturing process had to be searched that on the first hand did not leave a burr and secondly, was able to produce a piece with a smaller caliber and a larger diameter without losing its elastic properties to recover the semi-circular shape when a deforming force is applied.

The process found belongs to the type of forming techniques with heating or thermoforming. Among these techniques we find the following:

Forming by adaptation, in which a hot sheet is placed over the male mold or is raised to the mold in order to adapt to its shape. Adaptation process is completed by creating a vacuum between the male mold and the sheet, or applying air pressure to it. Products made by this process show a large thickness on the bottom that decreases until it reaches a minimum at the edges, which is not convenient for the purposes of the piece and processes described here.

Vacuum Molding, where the sheet is fixed on the edge of the female mold and then a vacuum is created. In contrast with the preceding process, the thickness of the piece is larger at the edges and reaches a minimum on the inferior part.

Pressure Forming, which is similar to vacuum molding, and compressed air up to a certain pressure is applied on the sheet, thus the system requires a chamber. This procedure is used to form thin sheets of materials such as PP, which is supplied in rolls, or to transform large thickness sheets in pieces with a fine detail surface.

Free blowing. Compressed air is applied between a chamber that substitutes the mold, nonexistent in this case, and the sheet to obtain a bubble with a height controlled by means of a photocell. Since the bubble formed from the sheet does not touch any metallic element, it has no marks and, except in the proximity of the fastening frame, has a regular thickness. Air cools the bubble making the piece rigid. The system is extensively used in "blister" containers (which means exactly "ampule") from a thin sheet supplied in rolls.

Mold and counter mold, to form pieces from relatively rigid polymers, such as PS foam. Vacuum can be applied to the female mold to aid in the forming process. Even though the closing pressures are about 0.35 MPa, certain movement of the material could be produced if forces of 1 MPa are applied.

Multiple stage forming, technique that was developed since the previously described methods have the difficulty of controlling the thickness in complex pieces such as parts with reduced radius and deep indents, especially when plates with an important thickness are formed. That is why methods with more than one step have been created, being the first one a type of stretching the sheet.

OBJECTIVES OF THE INVENTION

Therefore, an object of the present invention is to provide a molding process or method that avoids the inconveniences of the prior art in relation to thermoforming of synthetic paper.

Also, another object is to form a piece built from synthetic paper that can be thermoformed keeping its elasticity properties with a low caliber, that is, to have a retractable memory.

An additional object of this invention is to build a sheet fastener device using the sheet holding device.

To the best of the inventor's knowledge, there is no thermoforming process for synthetic paper, once it has been formed in sheets.

BRIEF DESCRIPTION OF THE INVENTION

A thermoforming process based on infrared radiation by a thin quartz lamp and preferably with water-cooled molds is provided. The process comprises in heating only the area to thermoform, on the rear part of the fastening strip 1, controlling the temperature within ±1° C., rapidly lowering the cooled counter-mold, apply pressure no higher than 0.83 MPa (120 psi)±5% and removing the mold.

In one embodiment of the invention, a piece of synthetic paper is provided, called fastener strip; built in caliber 14 with an upper part radius of approximately 0.7 cm to 1.2 cm. This piece has a great elasticity, withstanding flexing cycles of at least 5,000 flexions before showing any fissures. The invention also covers a holding device that holds this piece, which in turns is placed in another medium called holder to finally achieve the function of holding previously punctured sheets in a safe and comfortable way.

The fastener strip is characterized by being formed by thermoforming that does not leave a burr on the same. Another characteristic of the thermoforming process is the fact of achieving an exact register of the desired zone to thermoform without affecting the rest of the body of the strip, which can or can't have printed indicia and a double-sided adhesive.

BRIEF DESCRIPTION OF THE FIGURES

FIGS. 9A to 9F show several views of the assembly process of the fastener shown in FIGS. 8A-8C. The fastener comprises a base, a fastening device and two fastening strips.

DETAILED DESCRIPTION OF THE INVENTION

Figure 1:
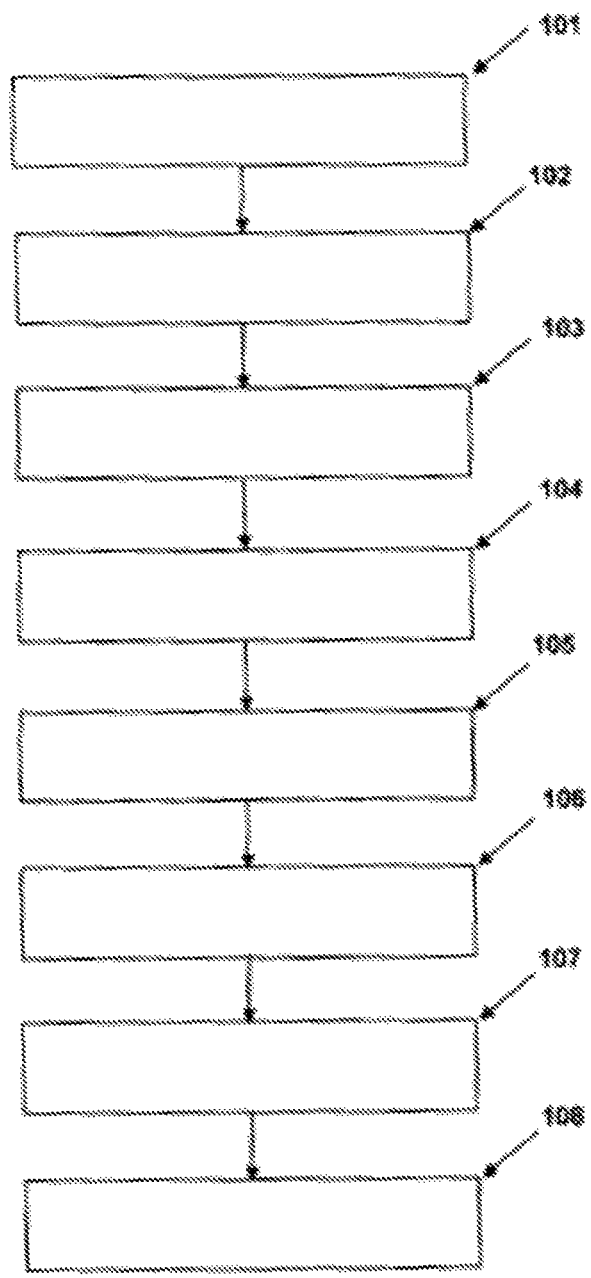
FIG. 1 shows a flow chart of the process by which the laminated thermoplastic of synthetic paper is thermoformed.

In FIG. 1, it can be seen that the process begins by printing 101 the synthetic paper templates with the shape of the strips, to later apply in 102 a double-sided adhesive and then cut 103 the formed template in order to obtain individual pieces. The synthetic paper fastening strip 1 is printed in 104 (see FIG. 3) with the corresponding indicia 2 such as logos, means to improve fastening such as points of relief, assembly instructions, etc. It is noted that the ink used was selected so that it withstands the operating temperature of the thermoforming. In step 102 a double-sided adhesive strip is placed, which has also been selected in order to withstand the temperatures generated in the thermoforming process without losing properties or dripping on the sides of the fastening strip 1. This adhesive strip will serve to join, on one side, the fastening strip 1 with a base 3. The adhesive is placed on the opposite side of the indicia 2.

Once the adhesive and the indicia 2 are placed on the strips 1, these are placed 105 in individual molds with the surface having the adhesive facing towards the heat source and are heated by a heat source that can be for example infrared radiation (thermoforming) exclusively in the zone G to be thermoformed. For this procedure, a thin mesh 4 is placed (106) with fine squares between the infrared lamp 5 and the zone to be heated or hook G (see FIGS. 3, 5A and 5B, among others).

It should be noted that this process is described in relationship to a curved zone G; however, other configurations are applicable depending on the final application of the thermoformed product. This mesh 4 is used to spread the heat and avoid an excessive concentration of heat on the zone to be thermoformed G. The temperature for the thermoforming process should be controlled within a range of 193° C.±1° C. On 107 the lamp is placed at a distance from the strip of approximately 1.4 cm. The mesh must be right in the middle. The exposition time of the strip to heat emitted by the lamp varies according to environmental conditions from 17 to 20 seconds. The mesh is built from stainless steel threads and the opening of its squares is from 0.1 mm to 0.4 mm, preferably 0.1 mm.

Once at the operating temperature, the next step follows in 108 consisting in removing the lamp, lowering the counter-mold 6, pressing and curing the synthetic paper. This stage must be performed quickly to avoid the strip 1 from getting cold; the lamp 5 should be removed in a way that will not interfere with the movement of the counter-mold 6 over the mold 7. It must be mentioned that the counter-mold is cooled at a temperature of 25° C.+5° C. The counter-mold comprises the male part 6a, formed by an elastomeric insert, while mold 7 comprises the female part (not shown), in order to form hook B (see FIGS. 2 and 5A).

Figure 3:
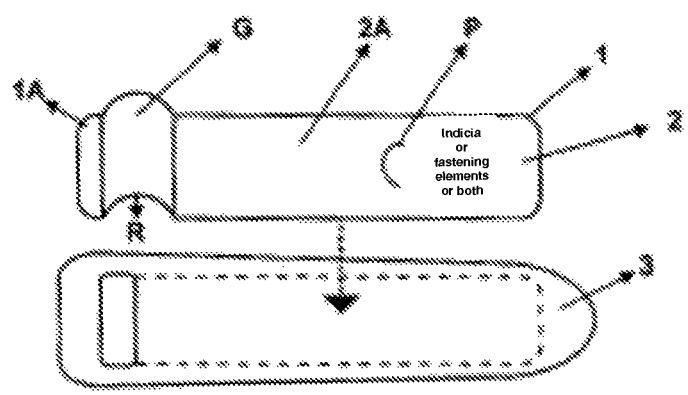
FIG. 3 shows an exploded view of the novel fastener device with the fastening strip and its base printed.
Figure 7A:
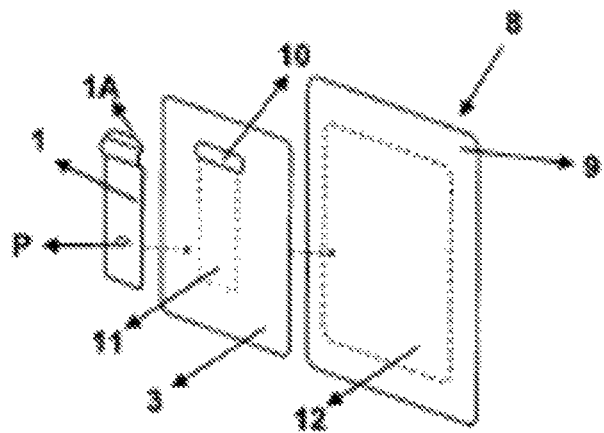
FIG. 7A is an exploded view of the device, object of this invention.
Figure 7B:
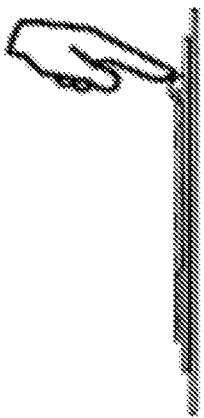
FIG. 7B is a schematic representation showing that a second base provides more rigidity to the ring aiding in the correct functioning of the system.

Once thermoformed and cured, the counter-mold 6 is removed and and the strip 1 is taken out of the mold, already formed as shown for example in FIGS. 3 and 7A.

During the manufacturing of the device described in document WO'021, a burr was formed that had to be eliminated, which produced a reduction, time consumption and loss of properties. It was surprisingly found that the best way to manufacture this device was individually and avoiding the burr that usually stays around the pieces made by the conventional thermoforming process. Fastening strip 1 requires, for functioning reasons, a very particular cyclical retractable capacity since its design is oriented to withstand thousand of flexions without losing its original shape. The thermoforming process provided the end product a retractable memory (flexion) of unique and very efficient characteristics.

A process that would not produce a burr was searched. Literature does not provide that such a process exists and manufacturers and distributors of synthetic paper could not offer help in that regards either, so the development of a propietary process was initiated.

Printing of the synthetic paper strip can be printed by means of printing techniques known in the art such as silk-screen printing, flexography, off-set, digital printing, etc.

At the end of the thermoforming process, the printings on the fastening strip should not show any variations and the double-sided adhesive should retain its properties.

The forming process of the adhesive strip provides a great benefit that consists of a perfect register of the printing on the piece, regular thickness, burr-free pieces and most importantly, a precise and constant mechanical function.

Pressing of the strip is done in a way such that the thickness of hook G is not decreased, but that at the same time it is enough to permanently deform the material. Also, the pressing process must take care not to produce deformations in any part of hook G or the adjacent parts.

Applying of abrupt cooling to hook G with the cold mold, but at the same time keeping the shape of the hook provides it with the anatomical stability properties in conjunction with a great elasticity of the hook.

Figure 2:
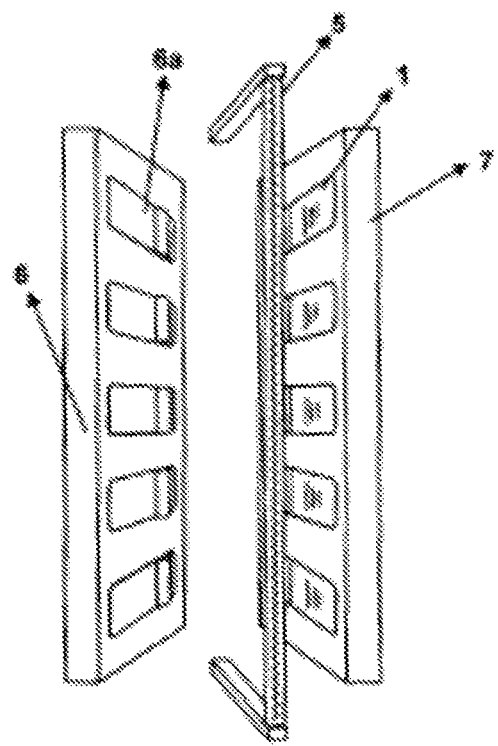
FIG. 2 shows a schematic of the components for the equipment used to perform the thermoforming.

Once the strip is formed, the cover of the double-sided adhesive strip is removed, located in the back of the fastening strip to adhere this strip to the base 3 (see FIGS. 2 and 3).

Figure 5A:
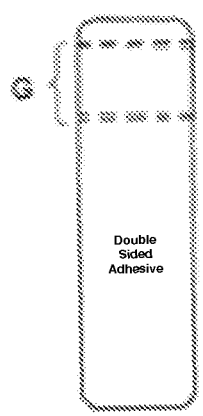
FIGS. 5A and 5B show details of the thermal behavior of the thermoforming process in the fastening strip.
Figure 5B:
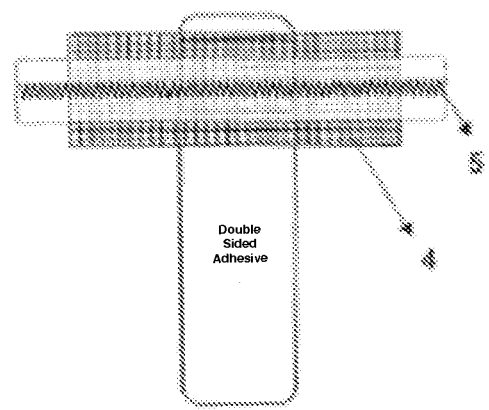

Considering now FIGS. 5A and 5B, it can be noted that the thermal behavior of the strip is as follows: when applying heat with the infrared lamp 5 through the mesh 4, the zone or hook G receives a certain amount of heat that dissipates towards the upper part of the strip and to the lower part of the same (that is, towards the double-sided adhesive).

Another of the important inconveniences was the thermal expansion undergone by the zone exposed to the heat. Is important to remember that the "hook" is not fastened to a frame that will keep it steady at the time of heat exposure, as a consequence, at the time of exposure, the zone experiences a certain degree of thermal expansion, enough to move the piece inside of the mold cavity, causing failures in register at the time of closing the matrix.

It was necessary to make millimetric modifications to the cavities to provide the necessary space for the expansion of the material.

Since synthetic paper is a bad heat conductor, a great amount of it will dissipate towards the upper part due to the reduced area of the tab and a smaller amount towards the lower part due to the joint of three materials (synthetic paper, double-sided adhesive and cover with double-sided adhesive). This phenomenon implied developing a method that would help to distribute heat homogeneously on the desired area to thermoform. The method consisted on introducing a mesh between the heat source and the material to thermoform.

Once the forming process was found, the strip 1 with caliber 12 and a larger diameter R of 0.7 cm to a diameter of 1.2 cm (FIG. 3) was worked on. However, once it was thermoformed, this strip showed deformation during operation.

Then it was decided to try with a different caliber, maintaining the diameter R of 0.7 cm and experimenting with different diameters up to 1.2 cm. The results obtained were optimal for the objectives of this invention since the piece did not deform, maintained its shape and improved greatly the amount of work cycles from 5,000 to 9,000 cycles.

Figure 6A:
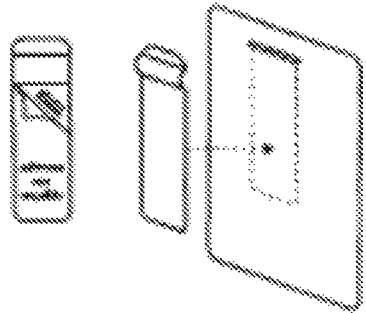
FIG. 6A is an exploded view of the device of the prior art.
Figure 6B:
FIG. 6B is a lateral view showing that when a force is applied, the ring gets deformed for not having restriction on its movement.
Figure 8A:
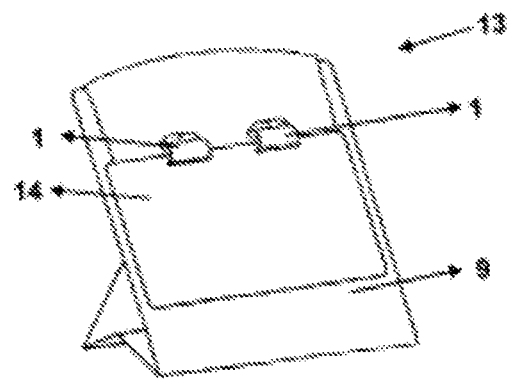
FIGS. 8A-8C show views of the sheets fastener built using the fastening strip and the sheet-fastening device of the present invention.
Figure 8B:
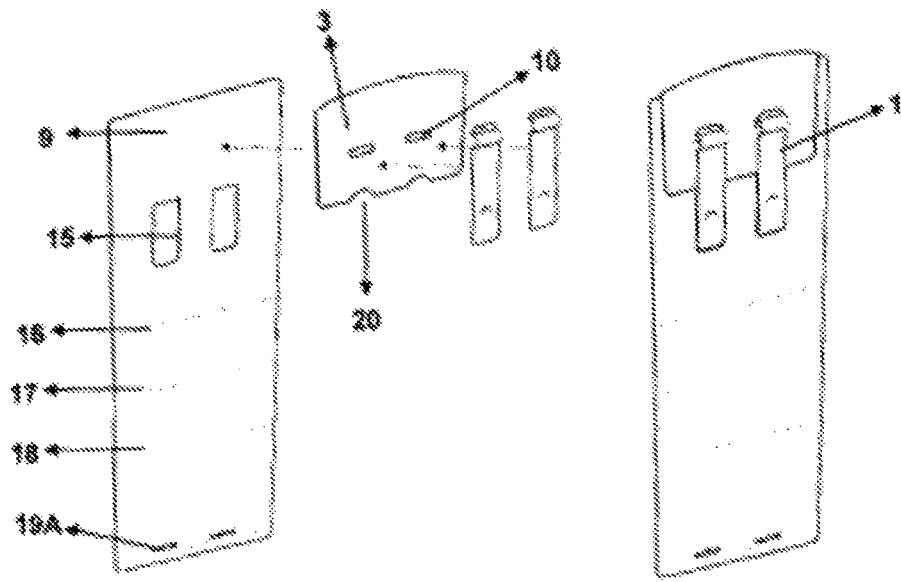

FIGS. 6A and 6B show the fastener of the prior art where it is shown that the arrangement of the sheets is not ideal because they do not sit correctly on their base since the curve of the strip does not posses the adequate configuration for lack of an additional base and where it is also noted that the hook of the plastic strip does not sit correctly on the rear part of the base stop functioning as planned. It was noted during the operation of the device of the prior art, that in absence of a second base or support base, it was difficult to open the tab (of the prior art) since when pressuring the curved body g of the strip with the finger to open the system, this doesn't find a stop and submerges, difficulting the opening. In other words, it simply does not work. Another important factor is aesthetics, the product in all its variations looks of a better quality when the tab 1a (of the present invention) of the strip stays hidden between the base 3 and the additional base 9 (as shown in FIGS. 7A and 8A). The curved body of the strip looks firm and with a good shape, the sheets find a better support over a well-defined curve and the functioning of the system is the ideal.

Figure 4:
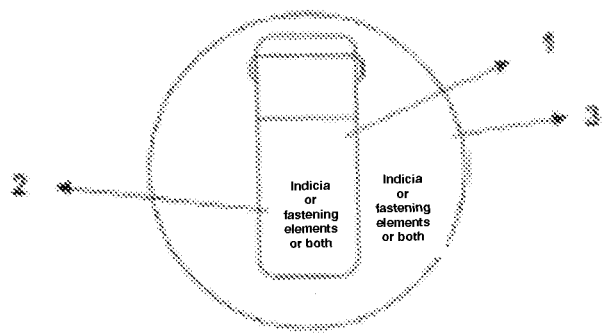
FIG. 4 is a variation of the device in FIG. 3.

Once the material and its process were determined, it was proceeded to design a fastening device 8. This design led to the one shown in FIG. 7A and comprises the fastening strip 1, the base 3 (or a variation of the same as the one shown in FIG. 4) and an additional base 9.

The fastening strip 1 formed as described above, comprises an adhesive strip (not shown) that will join this strip to the base 3, such joint is indicated by the dotted reference 11. This base 3 is joined to the additional base 9 where its joint is represented by dotted reference 12. The joint between these two bases is again done by a double-sided adhesive strip (not shown). The base 3 also comprises a slot 10 for introducing tab 1A through said slot 10. It is important to point out that this slot has a greater height than the one indicated in document WO'021 because another defect found was that during use, the tab got continuously stuck due to the narrowness of the slot height. Note and compare the dimensions of both slots shown schematically in FIGS. 6A and 7A. The width of both slots is the same; however, the height is significantly different being at least 20% of the length of the slot for the novel slot. The widths of the slots can vary from 1.5 cm to 5.0 cm maximum (this parameter also applies for the width of the strip and for the fastener hook). In the case of the height of the opening, it should be a minimum of 0.6 mm to a maximum of 1 cm (the height of the opening in document WO'021 was 0.3 mm so it increased 100%).

In an embodiment of the invention, base 3 covers only approximately half of the length of the fastening strip. Strip 1 comprises a tab 1A and a body 2A that optionally includes in its lower part a pullout tab P in the shape of a half circle or half rectangle that works as a guide to position the fastener in the right way and as a work mechanism for its use in other devices as will be shown later. A preferred embodiment is the device shown in FIG. 8A that comprises a base 3 and two devices 1 placed next to each other.

Described below is an exemplary embodiment of an application of the fastener strip 1 by means of a sheet fastener product represented by a desk calendar.

Example 1

Device 13 shown in FIGS. 8A and 9F is a sheet fastener represented for description purposes and is not limited to a calendar.

Fastener 13 comprises the fastening strip 1, the base 3 and the additional base 9. The sheets, besides having the shape of a calendar, can be sheets with advertisement or technical information, blank sheets or similar. Such sheets are previously slotted according to the amount of fastening strips 1 provided in fastener 13.

Fastener 13, in the embodiment illustrated, comprises two fastening strips 1 joined by double-sided adhesive to base 3, which in turns is to the additional base 9. Base 3 has a length approximately equal to half the length of the fastening strip 1.

As shown in FIGS. 8A to 9F, the additional base 9 comprises two windows 15, a first folding line 16, a second intermediate folding line 17, a third folding line 18 and two slots or cuts 19A, placed on the lower part, opposite to windows 15.

In the case of base 3, it has under the slots 10 two semicircular indents 20, which will serve as guides for strips 1, as described below.

The fastener is built (see FIGS. 8A-8C) by joining the fastening strips 1 to the base 3, making sure that they are aligned with slots 10 and indents 20. The strips have double-sided adhesive, one of the sides is joined to the same strip 1 and the other side is joined to the base 3. Once base 3 is joined to the fastening strip by means of this adhesive, it is placed, on the side opposite to the base 3, another double-sided adhesive to be joined with the front side of the additional base 9.

Figure 8C:
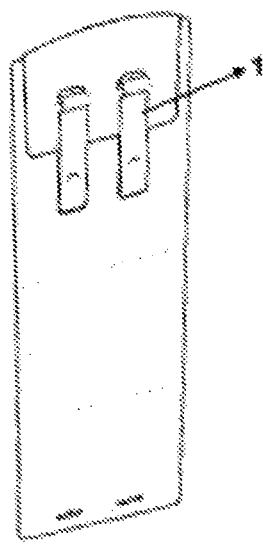
Figure 8C:
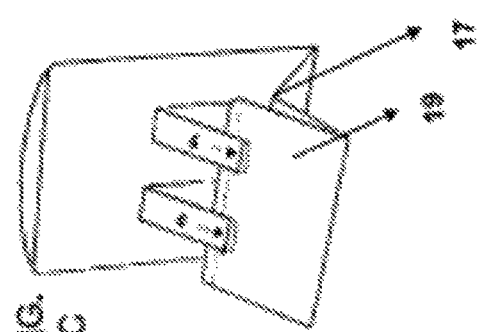
Figure 8D:
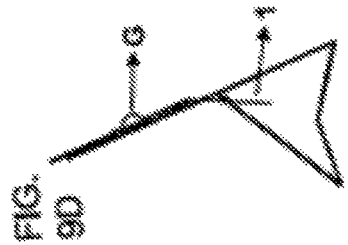
Figure 8B:
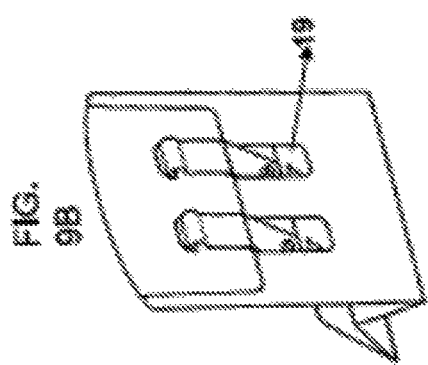
Figure 8E:
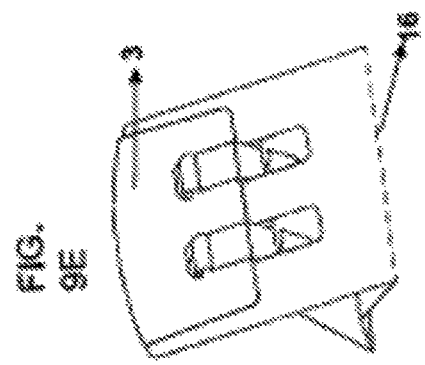
Figure 8A:
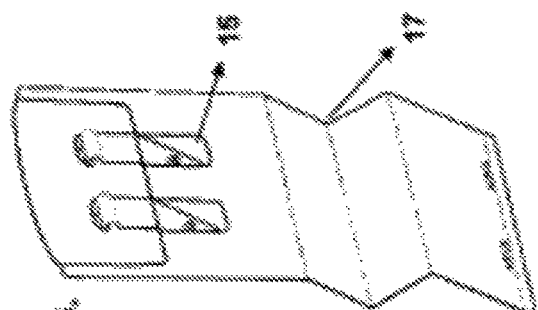
Figure 8F:
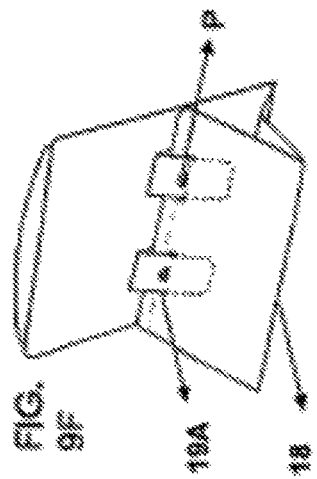

After this, the piece shown in FIG. 8C is obtained.

To form the calendar, the steps shown in FIGS. 9A to 9F are followed. The assembled piece is folded on the intermediate folding line 17 extending it towards the rear side of the same. The folding continues until the lower edge of the lower part 19 makes contact with the fastening strips that have been previously folded for passing through windows 15 towards the rear side of the assembled piece as shown in FIG. 9B. Then the lower part of the fastening strips 1 are introduced into slots 19A sliding the strip until the pullout tab P, of each strip, passes through slot 19A (see FIG. 9C). Once the pullout tab P passes through slot 19A, the calendar is assembled and locked to avoid disassembling by its handling.

FIG. 9E shows the calendar completely assembled in a left frontal isometric view and image 9F shows a rear isometric view of the same where the locking effect that pullout tab P provides in conjunction with slots 19A is appreciated in more detail. The lower part of the fastening strips is shown in a dotted line. This locking mechanism prevents that the intermediate folding line 17 recovers its initial position and deforms the calendar. Folding lines 16 and 18 are now the support base of the calendar.

The invention has been described making reference especially to one of its embodiments and that consists in the final production of an article such as a desk calendar; however, the final product produced can take different forms. It is requested that in as much as these forms are evident to a person with average knowledge in the art, they are included within the scope of this invention.

The invention claimed is:

1. A sheet fastener comprising:
   two fastening strips (1), each one having: a body (2A), a tab (1A) provided on an upper part of said body (2A), a hinged pullout tab (P) provided on a lower part of said body (2A), and a curved area (G) provided on said upper part of said body (2A) between said tab (1A) and said hinged pullout tab (P);
   a base (3) having a length approximately equal to half the length of each fastening strip (1); and
   an additional base (9) including two windows (15) provided on an upper part of said additional base (9), two slots (19A) provided on a lower part of said additional base (9) opposite to the windows (15), and a support section consisting of: a first folding line (16), a second folding line (17), and a third folding line (18) provided between said two windows (15) and said two slots (19A), wherein said base (3) is positioned between the fastening strips (1) and the additional base (9) so that the hinged pullout tab (P) of each fastening strip (1) serve as a positioning guide and a locking mechanism for the support section when said sheet fastener is in use.

2. The sheet fastener of claim 1, wherein said support section of the additional base (9) serves as a standing base of the sheet fastener by folding said first folding line (16), said second folding line (17) and said third folding line (18) so that said two slots (19A) face a rear wall of said additional base (9) and the lower parts of the two fastening strips (1) are inserted through said two windows (15), respectively, until the hinged pullout tabs (P) of each fastening strip (1) is latched against said two slots (19A), respectively.

3. The sheet fastener of claim 1, wherein the base (3) further includes two semicircular indents (20) provided on a lower part of said base (3), serving as guides for the fastening strips (1) when said fastening strips (1) are inserted through said two windows (15).

4. The sheet fastener of claim 3, wherein the base (3) further includes two below slots (10) so that the two tabs (1A) are inserted through said below slots (10) and remain hidden between said base (3) and said additional base (9).

5. The sheet fastener of claim 1, wherein said fastening strips (1), said base (3) and said additional base (9) are joined together by double-sided adhesive.

6. The sheet fastener of claim 1, wherein pre-slotted sheets are fastened to said sheet fastener by inserting the curved area (G) of each fastening strip (1) through each slot of said sheets.

* * * * *